(12) United States Patent     (10) Patent No.:   US 12,590,448 B2

Xu et al.          (45) Date of Patent:     Mar. 31, 2026

(54) CONTROL SYSTEM AND A CONTROL METHOD OF INTELLIGENT TOILETS

(71) Applicant: ZHEJIANG IKAHE SANITARY WARE CO., LTD., Taizhou (CN)

(72) Inventors: Guangqi Xu, Taizhou (CN); Rui Liu, Taizhou (CN)

(73) Assignee: ZHEJIANG IKAHE SANITARY WARE CO., LTD., Taizhou (CN)

( * ) Notice: Subject to any disclaimer, the term of this patent is extended or adjusted under 35 U.S.C. 154(b) by 181 days.

(21) Appl. No.: 18/755,654

(22) Filed: Jun. 26, 2024

(65) Prior Publication Data

US 2024/0344311 A1     Oct. 17, 2024

Related U.S. Application Data

(63) Continuation of application No. PCT/CN2023/141167, filed on Dec. 22, 2023.

(30) Foreign Application Priority Data

Dec. 28, 2022    (CN) ......................... 202211716170.0

(51) Int. Cl.
    *E03D 9/00*       (2006.01)
    *H04Q 9/00*      (2006.01)

(52) U.S. Cl.
    CPC ................. *E03D 9/00* (2013.01); *H04Q 9/00* (2013.01); *E03D 2201/00* (2013.01)

(58) Field of Classification Search
    CPC .............. E03D 9/00; H04Q 9/00; H04Q 9/02
    See application file for complete search history.

(56) References Cited

U.S. PATENT DOCUMENTS

2019/0365572 A1*   12/2019   Park ...................... G01D 21/02

FOREIGN PATENT DOCUMENTS

CN     109725664 A   *   5/2019
CN     116009614 A     4/2023

OTHER PUBLICATIONS

Translation of CN-109725664-A (Year: 2019).*
International Search Report issued in International Application No. PCT/CN2023/141167, mailed Mar. 14, 2024, 10 pages.
Written Opinion of International Searching Authority in international application No. PCT/CN2023/141167, dated Mar. 14, 2024, 12 pages.

* cited by examiner

*Primary Examiner* — Lauren A Crane

(74) *Attorney, Agent, or Firm* — BAYES PLLC

(57)          ABSTRACT

The embodiments of this application disclose a control system and a control method of intelligent toilets. The control system includes a toilet body, a communication device which is set on the toilet body to acquire the geographic location information of the toilet body, and transmit the acquired geographic location information to a server which acquires the external environment information of the toilet body based on the geographic location information and generates the adjustment parameters based on the external environment information. The external environment information includes the environment temperature information, the environment humidity information, and the sensory temperature information. The control system also includes a controller which is set on the toilet body to receive the adjustment parameters from the server and control the working temperature of the toilet body based on the adjustment parameters.

19 Claims, 2 Drawing Sheets

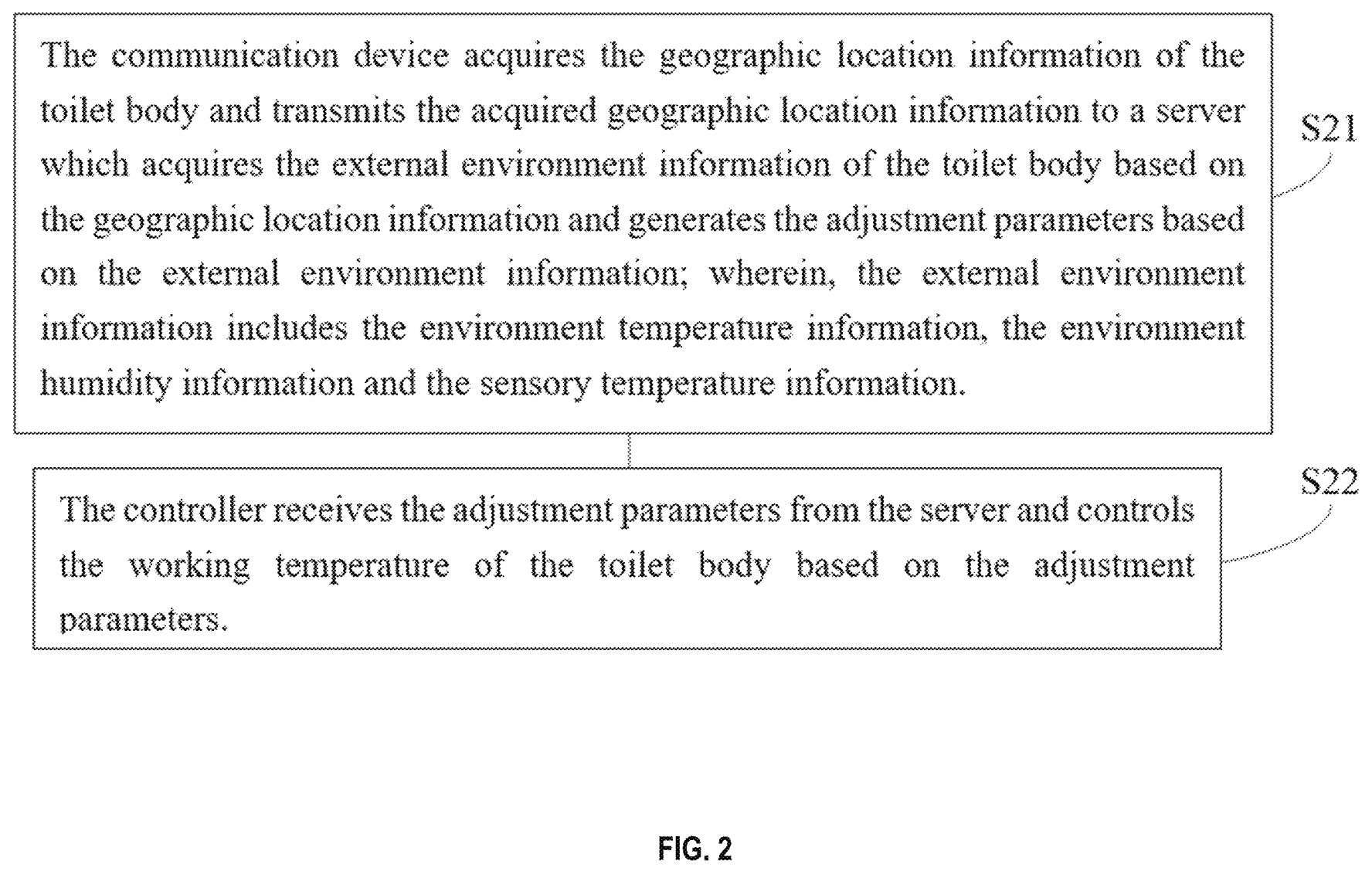

S21

The communication device acquires the geographic location information of the toilet body and transmits the acquired geographic location information to a server which acquires the external environment information of the toilet body based on the geographic location information and generates the adjustment parameters based on the external environment information; wherein, the external environment information includes the environment temperature information, the environment humidity information and the sensory temperature information.

S22

The controller receives the adjustment parameters from the server and controls the working temperature of the toilet body based on the adjustment parameters.

FIG. 2

CONTROL SYSTEM AND A CONTROL METHOD OF INTELLIGENT TOILETS

CROSS-REFERENCE TO RELATED APPLICATION

The present application is a continuation of International Application No. PCT/CN2023/141167, filed on Dec. 22, 2023, which claims the benefit of priority to Chinese Patent Application No. 2022117161700, filed on Dec. 28, 2022. The contents of both are hereby incorporated by reference in their entireties.

TECHNICAL FIELD

The embodiments of this application pertain to an intelligent sanitary product technology field, and particularly to a control system and a control method of intelligent toilets.

TECHNICAL BACKGROUND

With the continuous development of smart homes, intelligent toilets are gradually replacing traditional toilets. Intelligent toilets generally have functions such as rinsing and heating to rinse and dry a user's body.

In the related art, in general, a sensor in the toilet body, such as air temperature sensor, measures the temperature, and transmits the acquired temperature to a controller which calculates the temperature by the built-in algorithm so as to determine the temperature grade suitable for the user, such as, the water heating grade, the seat heating grade and the air heating grade.

However, because the sensor is generally set in the toilet body, the environment temperature measured by the sensor is the internal temperature of the toilet body instead of the actual environment temperature. Consequently, it is impossible to accurately acquire the temperature parameters suitable for users, thereby leading to poor user usage experience and other problems.

SUMMARY

The embodiments of this application provide a control system and a control method of intelligent toilets to solve the problem of impossible acquisition of accurate temperature parameters in the related art, resulting in poor user usage experiences.

To solve the above technical problem, the first technical scheme adopted in this application is a control system of intelligent toilets, including a toilet body, a communication device which is set on the toilet body to acquire the geographic location information of the toilet body, and transmit the acquired geographic location information to a server which acquires the external environment information of the toilet body based on the geographic location information and generates the adjustment parameters based on the external environment information, where the external environment information includes the environment temperature information, the environment humidity information and the sensory temperature information, and a controller which is set on the toilet body to receive the adjustment parameters from the server and control the working temperature of the toilet body based on the adjustment parameters.

In some embodiments, the server includes a local server which is set on the toilet body and is electrically connected with the communication device and the controller.

In some embodiments, the server includes a cloud server. The communication device is connected with the cloud server by communication and the communication connection circuit of the controller is connected with the cloud server by communication.

In some embodiments, the toilet body is also set with a water heating device, a seat heating device and a drying device. The controller controls the working temperature of the water heating device, the seat heating device, and the drying device.

In some embodiments, the toilet body is set with a sensor.

In some embodiments, the sensor includes a temperature sensor.

In some embodiments, the sensor is set in the drying device and is electrically connected with the communication device.

In some embodiments, the toilet body is set with a nozzle.

In some embodiments, the communication device includes at least one of a WiFi component, a bluetooth component, and a GPRS module component.

In some embodiments, the controller includes at least one of a single-chip microcomputer, an embedded chip and a digital controller.

To solve the above technical problem, the second technical scheme adopted in this application is a control method of intelligent toilets which is realized by the control system of intelligent toilets which includes a communication device and a controller on the toilet body. The control method includes that the communication device acquires the geographic location information of the toilet body and transmits the acquired geographic location information to a server which acquires the external environment information of the toilet body based on the geographic location information and generates the adjustment parameters based on the external environment information. The external environment information includes the environment temperature information, the environment humidity information and the sensory temperature information. The controller receives the adjustment parameters from the server and controls the working temperature of the toilet body based on the adjustment parameters.

In some embodiments, the server carries a preset software algorithm. A step that the communication device acquires the geographic location information of the toilet body and transmits the acquired geographic location information to a server which acquires the external environment information of the toilet body based on the geographic location information and generates the adjustment parameters based on the external environment information includes that the communication device acquires the geographic location information of the toilet body and transmits the acquired geographic location information to a server which acquires the external environment information of the toilet body based on the geographic location information and calculates the external environment information by software algorithm so as to obtain the corresponding adjustment parameters.

In some embodiments, the adjustment parameters include the temperature parameter. A step that the communication device acquires the geographic location information of the toilet body and transmits the acquired geographic location information to a server which acquires the external environment information of the toilet body based on the geographic location information and calculates the external environment information by software algorithm so as to obtain the corresponding adjustment parameters includes that the server calculates the external environment information by software algorithm so as to obtain the temperature parameters of those devices of the toilet body.

In some embodiments, the temperature parameters include a water heating parameter, a seat heating parameter and an air heating parameter; the control system also includes a water heating device, a seat heating device and a drying device on the toilet body. A step that the server calculates the external environment information by software algorithm so as to obtain the temperature parameters of the toilet body includes that the server calculates the external environment information by software algorithm so as to obtain the water heating parameter of the water heating device, the seat heating parameter of the seat heating device and the air heating parameter of the drying device.

In some embodiments, a step that the controller receives the adjustment parameters from the server and controls the working temperature of the toilet body based on the adjustment parameters includes that the controller receives the temperature parameters from the server and controls the working temperature of the toilet body based on the temperature parameters.

In some embodiments, a step that the controller receives the temperature parameters from the server and controls the working temperature of the toilet body based on the temperature parameters includes that the controller receives the water heating parameter, the seat heating parameter and the air heating parameter and controls the working temperature of the water heating device, the seat heating device and the drying device based on the water heating parameter, the seat heating parameter and the air heating parameter.

In some embodiments, the communication device is also used to acquire the user usage data of the toilet body; a step that the communication device acquires the geographic location information of the toilet body and transmits the acquired geographic location information to a server which acquires the external environment information of the toilet body based on the geographic location information and generates the adjustment parameters based on the external environment information includes that the communication device acquires the geographic location information and the user usage data of the toilet body and transmits the acquired geographic location information and the user usage data to a server which acquires the external environment information of the toilet body based on the geographic location information and generates the adjustment parameters based on the external environment information and the user usage data.

In some embodiments, the user usage data includes the water heating parameter, the seat heating parameter and the air heating parameter preferred by the user.

In some embodiments, a step that the communication device acquires the geographic location information and the user usage data of the toilet body and transmits the acquired geographic location information and the user usage data to a server which acquires the external environment information of the toilet body based on the geographic location information and generates the adjustment parameters based on the external environment information and the user usage data includes that the communication device acquires the geographic location information and the user usage data of the toilet body and transmits the acquired geographic location information and the user usage data to a server which acquires the external environment information of the toilet body based on the geographic location information and generates the adjustment parameters based on the external environment information and the water heating parameter, the seat heating parameter and the air heating parameter preferred by the user.

The beneficial effect of the embodiments of this application is that this application provides a control system and a control method of intelligent toilets. The communication device on the toilet body acquires the geographic location information, the server can accurately acquire the external environment information of the toilet body based on the geographic location information and generate the proper adjustment parameters based on the external environment information, the controller receives the adjustment parameters from the server and controls the working temperature of the toilet body based on the adjustment parameters so as to accurately match the working temperature with the sensory temperature of users, thereby improving the user usage experiences.

BRIEF DESCRIPTION OF DRAWINGS

By combining the accompanying drawings, a more detailed description of exemplary embodiments of the present application will be given, and the above and other objects, features, and advantages of the present application will become more apparent. In the exemplary embodiments of the present application, the same reference numerals generally denote the same parts.

FIG. 2 illustrates a process diagram of an embodiment of the control method of intelligent toilets in this application.

DETAILED DESCRIPTION

Figure 1:
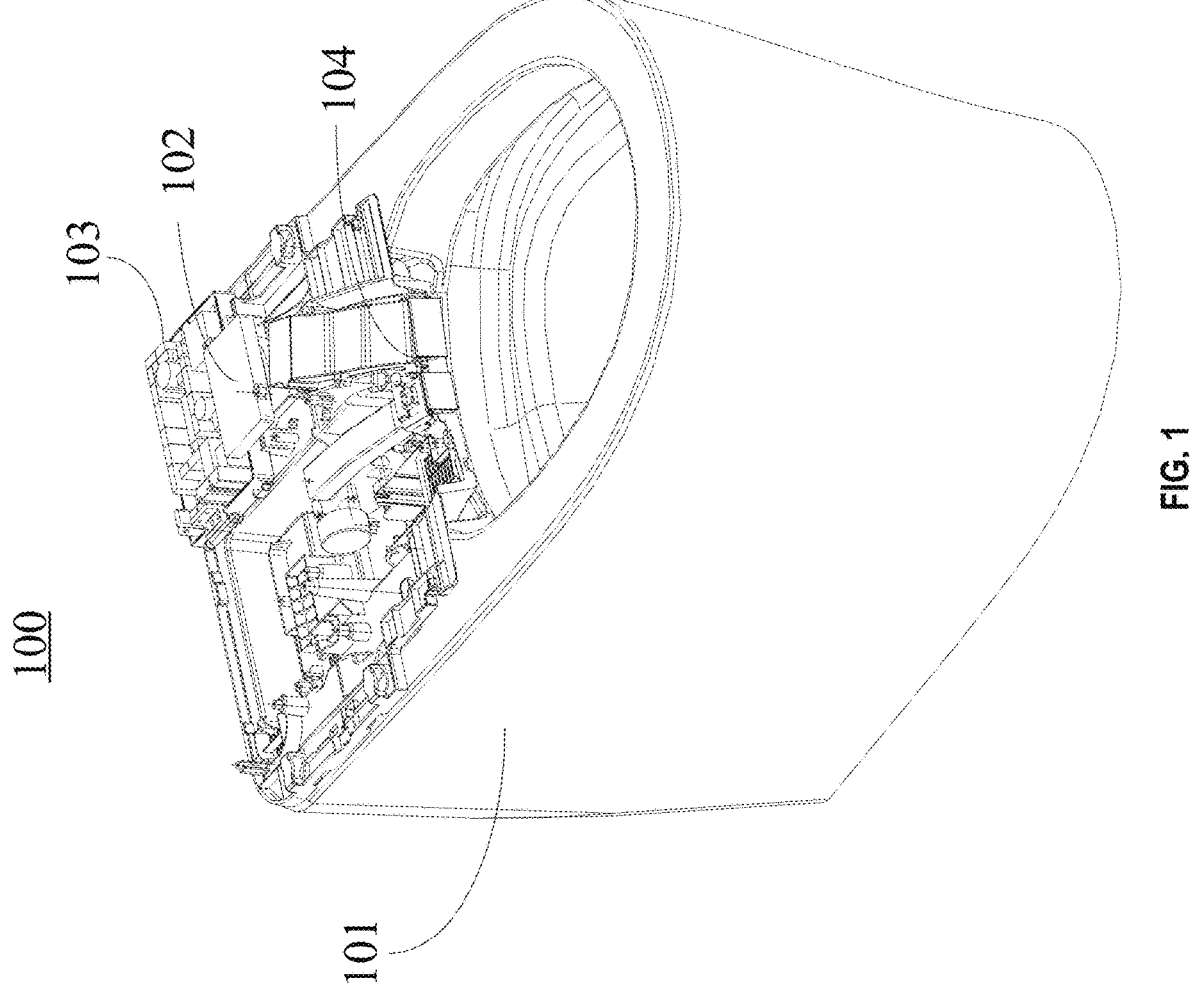
FIG. 1 illustrates a structural schematic diagram of an embodiment of the control system of intelligent toilets in this application.

To make objectives, technical solutions, and advantages of the present disclosure clearer, embodiments of the present disclosure are described in further detail below with reference to the drawings.

For better knowledge of the application, the following drawings and specific embodiments show a more detailed description for the application. It should be noted that when a component is expressed as "fixed on" another component, it may be directly fixed on another component, or there may be one or more medium components. When a component is expressed as "connected to" another component, it may be directly connected to another component, or there may be one or more medium components. When a component is expressed as "connect to" or "connects to" another component, it may directly connect to another component, or there may be one or more medium components. The terms "perpendicular," "horizontal," "left," "right," and other similar expressions are used to denote relative spatial relationships between different components or objects in the specification and are not intended to limit their respective positions.

Unless otherwise defined, all technical and scientific terms in the specifications show the same meanings as those commonly understood by the persons skilled in the art of this application. The terms in the specifications in the application are only for describing the purpose of specific embodiments and are not intended to limit the application. The term "and/or" in the specifications include any and all combinations of one or more related listed items.

FIG. 1 illustrates a structural schematic diagram of an embodiment of the control system of intelligent toilets in this application.

The embodiments of this application provide a control system of intelligent toilets. Specifically, referring to FIG. 1, in this embodiment, the control system 100 includes a toilet body 101, a communication device 102 on the toilet body 101, and a controller 103. The communication device 102 acquires the geographic location information of the toilet body 101 and transmits the acquired geographic location information to a server which acquires the external environment information of the toilet body 101 based on the geographic location information and generates the adjustment parameters based on the external environment information. The controller 103 receives the adjustment parameters from the server and controls the working temperature of the toilet body 101 based on the adjustment parameters.

In some embodiments, the communication device 102 may be a WiFi component, a bluetooth component, or a GPRS module component, etc.

The controller 103 is a single-chip microcomputer, an embedded chip, or a digital controller DCP, etc. The operating system of the controller 103 may be Linux and other systems, such as Windows, Android, IOS, with no more restrictions hereby.

In this embodiment, the server includes a cloud server or a local server, with no more restrictions hereby.

In a specific implementation scenario, the server is a local server and is set on the toilet body 101. The local server is electronically connected with the communication device 102 and the controller 103, has the communication function, and can acquire the external environment information based on the geographic location information acquired by the communication device 102.

In another specific implementation scenario, the server is a cloud server. The communication device 102 is connected with the cloud server by communication and the communication connection circuit of the controller 103 is connected with the cloud server by communication.

In this embodiment, the toilet body 101 is also set with a water heating device, a seat heating device, and a drying device. The controller 103 controls the working temperature of the water heating device, the seat heating device, and the drying device.

Specifically, during using the control system 100, the communication device 102 is networked to acquire the geographic location information of the toilet body 101 and transmits the acquired geographic location information to a server. The server is connected with the database of the National Meteorological Information Center or a similar meteorological database by public network to acquire the environment temperature information, the environment humidity information and the sensory temperature information corresponding to geographic location information based on the database of the National Meteorological Information Center or a similar meteorological database. The software algorithm preset in the server calculates the acquired environment temperature information, environment humidity information and sensory temperature information so as to obtain adjustment parameters suitable for the user, such as the water heating parameter, the seat heating parameter and the air heating parameter. The controller 103 receives the adjustment parameters from the server and calls the corresponding adjustment parameters to control the working temperature of the water heating device, the seat heating device and the drying device on the toilet body 101 if the detection reveals that a user is using the toilet body 101, to ensure that the nozzle water temperature, the seat temperature and the air temperature of the drying device are matched with the sensory temperature of the user.

It should be understood that the communication device 102 acquires the geographic location information of the toilet body 101 and transmits the acquired geographic location information to a server which acquires the environment temperature information, the environment humidity information and the sensory temperature information based on the geographic location information and calculates the adjustment parameters of the toilet body 101 based on the acquired multiple information. The controller 103 adjusts the working temperature of the toilet body 101 based on the adjustment parameters, which can not only realize the temperature adaptive adjustment of toilet products, but also can accurately match with the sensory temperature suitable for users, thereby improving the user usage experiences.

In this embodiment, when transmitting the adjustment parameters, the server also transmits the temperature grade corresponding to the adjustment parameters. For example, if the adjustment parameter is 37°, the generated temperature grade is medium grade; if the adjustment parameter is 50°, the generated temperature grade is high grade.

In this embodiment, the toilet body 101 is also set with a sensor 104.

In some embodiments, the sensor 104 is a temperature sensor. The sensor 104 can be set in the drying device and is electronically connected with the communication device 102 to transmit the acquired temperature to the communication device 102. The communication device 102 transmits the temperature to a server for providing reference for the subsequent calculation of temperature.

In this embodiment, the communication device 102 is electrically connected with the controller 103.

Specifically, the controller 103 stores the user usage data. During acquiring the geographic location information, the communication device 102 also can read the user usage data stored in the controller 103 and transmit the user usage data to a server which generates the adjustment parameters based on the external environment information and the user usage data.

It should be understood that the user usage data can show the user preferences, i.e., the water temperature, the seat temperature and the air temperature preferred by users. In addition, the environment factors and the user preferences are considered to well match the acquired adjustment parameters with the user usage demand with a view to further improving the user usage experiences.

In this embodiment, the controller 103 also receives the user instructions and controls the working temperature of the toilet body 101 based on the user instructions. In some embodiments, the user instructions can be issued by a terminal application (APP) or by a remote controller adapted to the toilet body 101.

It should be understood that the control of toilet body 101 based on the user instructions realizes the accurate adjustment of the working temperature of the toilet body 101. Therefore, the toilet products can meet the different demands of different users in a flexible way.

Different from the related art, as for the control system 100 in this embodiment, the communication device 102 which is set on the toilet body 101 acquires the geographic location information of the toilet body 101, the server can accurately acquire the external environment information of the toilet body 101 based on geographic location information and generate the proper adjustment parameters based on the external environment information. The controller 103 acquires the adjustment parameters from the server and controls the working temperature of the toilet body 101 based on the adjustment parameters to ensure that the working temperature can accurately match with the sensory temperature of users, thereby improving the user usage experiences.

FIG. 2 illustrates a process diagram of an embodiment of the control method of intelligent toilets in this application.

Referring to FIG. 2, in this embodiment, the control method is realized by the control system of intelligent toilets. The control system includes a communication device and a controller on the toilet body.

The control method includes:

S21: The communication device acquires the geographic location information of the toilet body and transmits the acquired geographic location information to a server which acquires the external environment information of the toilet body based on the geographic location information and generates the adjustment parameters based on the external environment information. In some embodiments, the external environment information includes the environment temperature information, the environment humidity information, and the sensory temperature information.

In this embodiment, the server includes a cloud server or a local server.

In some embodiments, the server carries a preset software algorithm.

In this embodiment, the communication device acquires the geographic location information of the toilet body and transmits the acquired geographic location information to a server which acquires the external environment information of the toilet body based on the geographic location information and calculates the external environment information by software algorithm so as to obtain the corresponding adjustment parameters.

Specifically, the software algorithm can be used to calculate based on the input external environment information (the environment temperature information, the environment humidity information and the sensory temperature information) to obtain the operation temperature of all devices of the toilet body, such as the working temperature of the water heating device, the seat heating device and the drying device.

It should be understood that the communication device acquires the geographic location information of the toilet body and transmits the acquired geographic location information to a server which acquires the environment temperature information, the environment humidity information and the sensory temperature information based on the geographic location information and calculates the adjustment parameters of the toilet body based on the acquired multiple information to ensure that the adjustment parameters can accurately match with the sensory temperature of users.

In some embodiments, the adjustment parameters include the temperature parameter. Specifically, the control system also includes a water heating device, a seat heating device and a drying device on the toilet body. The temperature parameters include a water heating parameter, a seat heating parameter and an air heating parameter to adjust the working temperature of the water heating device, the seat heating device, and the drying device respectively.

In this embodiment, the communication device is also used to acquire the user usage data of the toilet body.

Specifically, the communication device acquires the geographic location information and the user usage data of the toilet body and transmits the acquired geographic location information and the user usage data to a server which acquires the external environment information of the toilet body based on the geographic location information and generates the adjustment parameters based on the external environment information and the user usage data.

It should be understood that the user usage data can show the user preferences, i.e., the water temperature, the seat temperature and the air temperature preferred by users. In addition, the environment factors and the user preferences are considered to well match the acquired adjustment parameters with the user usage demand.

S22: The controller receives the adjustment parameters from the server and controls the working temperature of the toilet body based on the adjustment parameters.

In this embodiment, the controller receives the temperature parameters from the server and controls the working temperature of the toilet body based on the temperature parameters.

Specifically, the controller receives the water heating parameter, the seat heating parameter and the air heating parameter and controls the working temperature of the water heating device, the seat heating device, and the drying device based on the water heating parameter, the seat heating parameter and the air heating parameter.

It should be understood that the controller receives the water heating parameter, the seat heating parameter and the air heating parameter from the server, calls the corresponding adjustment parameters to control the working temperature of the water heating device, the seat heating device and the drying device on the toilet body if the detection reveals that a user is using the toilet body to match the water temperature, the seat temperature and the air temperature provided by the drying device with the sensory temperature of users, thereby effectively improving the user usage experiences.

Different from the related art, in this embodiment, a communication device which is set on the toilet body acquires the geographic location information of the toilet body, a server acquires the external environment information of the toilet body based on the geographic location information and generates the proper adjustment parameters based on the external environment information, and a controller acquires the adjustment parameters from the server and controls the working temperature of the toilet body based on the adjustment parameters to precisely match the working temperature with the sensory temperature of users, thereby improving the user usage experiences.

The above content is only the embodiments in this application and constitutes no limitation to the scope of the patent in this application. Any equivalent structure or equivalent process transformation made by reference of the specification and accompanying drawings in this application, or direct or indirect application in other related technical fields are included in the protection scope of the patent in this application.

What is claimed is:

1. A control system of intelligent toilets, comprising:
a toilet body;
a communication device, set on the toilet body to acquire geographic location information of the toilet body and to transmit the acquired geographic location information to a server configured to acquire external environment information of the toilet body based on the geographic location information and to generate adjustment parameters based on the external environment information, wherein the external environment information comprises environment temperature information, environment humidity information, and sensory temperature information; and a controller, set on the toilet body to receive the adjustment parameters from the server and to control working temperature of the toilet body based on the adjustment parameters.

2. The control system according to claim 1, wherein
the server comprises a local server set on the toilet body; and
the local server is electrically connected with the communication device and the controller.

3. The control system according to claim 1, wherein
the server comprises a cloud server; and
the communication device is connected with the cloud server by communication and communication connection circuit of the controller is connected with the cloud server by communication.

4. The control system according to claim 1, wherein
the toilet body is also set with a water heating device, a seat heating device, and a drying device; and
the controller controls the working temperature of the water heating device, the seat heating device, and the drying device.

5. The control system according to claim 4, wherein the toilet body is set with a sensor.

6. The control system according to claim 5, wherein the sensor comprises a temperature sensor.

7. The control system according to claim 5, wherein the sensor is set in the drying device and is electrically connected with the communication device.

8. The control system according to claim 1, wherein the toilet body is set with a nozzle.

9. The control system according to claim 1, wherein the communication device comprises at least one of a WiFi component, a bluetooth component, or a GPRS module component.

10. The control system according to claim 1, wherein the controller comprises at least one of a single-chip microcomputer, an embedded chip, or a digital controller.

11. A control method of intelligent toilets, wherein the control method is realized by a control system of intelligent toilets, the control system of intelligent toilets comprising a communication device and a controller on a toilet body, and wherein:
the communication device acquires geographic location information of the toilet body and transmits the acquired geographic location information to a server, wherein the server acquires external environment information of the toilet body based on the geographic location information and generates adjustment parameters based on the external environment information, the external environment information comprising environment temperature information, environment humidity information, and sensory temperature information; and
the controller receives the adjustment parameters from the server and controls working temperature of the toilet body based on the adjustment parameters.

12. The control method according to claim 11, wherein
the server carries a preset software algorithm;
a step where the communication device acquires the geographic location information of the toilet body and transmits the acquired geographic location information to a server configured to acquire the external environment information of the toilet body based on the geographic location information and generate the adjustment parameters based on the external environment information comprises:

the communication device acquires the geographic location information of the toilet body and transmits the acquired geographic location information to a server configured to acquire the external environment information of the toilet body based on the geographic location information and calculate the external environment information by software algorithm so as to obtain the corresponding adjustment parameters.

13. The control method according to claim 12, wherein
the adjustment parameters comprise temperature parameter;
a step that the communication device acquires the geographic location information of the toilet body and transmits the acquired geographic location information to a server configured to acquire the external environment information of the toilet body based on the geographic location information and calculate the external environment information by software algorithm so as to obtain the corresponding adjustment parameters comprises that:
the server calculates the external environment information by software algorithm so as to obtain the temperature parameters of those devices of the toilet body.

14. The control method according to claim 13, wherein
the temperature parameters comprise a water heating parameter, a seat heating parameter, and an air heating parameter, and a control system also comprises a water heating device, a seat heating device, and a drying device on the toilet body;
a step that the server calculates the external environment information by software algorithm so as to obtain the temperature parameters of the toilet body comprises that:
the server calculates the external environment information by software algorithm so as to obtain the water heating parameter of the water heating device, the seat heating parameter of the seat heating device, and the air heating parameter of the drying device.

15. The control method according to claim 13, wherein
a step that the controller receives the adjustment parameters from the server and controls the working temperature of the toilet body based on the adjustment parameters comprises that:
the controller receives the temperature parameters from the server and controls the working temperature of the toilet body based on the temperature parameters.

16. The control method according to claim 14, wherein
a step that the controller receives the temperature parameters from the server and controls the working temperature of the toilet body based on the temperature parameters comprises that:
the controller receives the water heating parameter, the seat heating parameter, and the air heating parameter, and controls the working temperature of the water heating device, the seat heating device, and the drying device based on the water heating parameter, the seat heating parameter, and the air heating parameter.

17. The control method according to claim 11, wherein
the communication device is also used to acquire user usage data of the toilet body;
a step that the communication device acquires the geographic location information of the toilet body and transmits the acquired geographic location information to a server configured to acquire the external environment information of the toilet body based on the geographic location information and generate the adjustment parameters based on the external environment information comprises that:

the communication device acquires the geographic location information and the user usage data of the toilet body and transmits the acquired geographic location information and the user usage data to a server configured to acquire the external environment information of the toilet body based on the geographic location information and generate the adjustment parameters based on the external environment information and the user usage data.

18. The control method according to claim 17, wherein the user usage data comprises a water heating parameter, a seat heating parameter, and an air heating parameter preferred by the user.

19. The control method according to claim 18, wherein a step that the communication device acquires the geographic location information and the user usage data of the toilet body and transmits the acquired geographic location information and the user usage data to a server configured to acquire the external environment information of the toilet body based on the geographic location information and generate the adjustment parameters based on the external environment information and the user usage data comprises that:

the communication device acquires the geographic location information and the user usage data of the toilet body and transmits the acquired geographic location information and the user usage data to a server configured to acquire the external environment information of the toilet body based on the geographic location information and generate the adjustment parameters based on the external environment information and the water heating parameter, the seat heating parameter, and the air heating parameter preferred by the user.

* * * * *